United States Patent
Lee et al.

(10) Patent No.: US 11,168,463 B2
(45) Date of Patent: Nov. 9, 2021

(54) HYDROSTATIC TRANSMISSION PEDAL STROKE LIMITER

(71) Applicant: Deere & Company, Moline, IL (US)

(72) Inventors: Adam Lee, Excelsior, MN (US); Thomas DeChant, Grovetown, GA (US)

(73) Assignee: DEERE & COMPANY, Moline, IL (US)

( * ) Notice: Subject to any disclaimer, the term of this patent is extended or adjusted under 35 U.S.C. 154(b) by 108 days.

(21) Appl. No.: 15/698,377

(22) Filed: Sep. 7, 2017

(65) Prior Publication Data

US 2019/0071847 A1 Mar. 7, 2019

(51) Int. Cl.

| | |
|---|---|
| *E02F 9/22* | (2006.01) |
| *F16H 61/437* | (2010.01) |
| *F16H 59/02* | (2006.01) |
| *F16H 61/47* | (2010.01) |
| *F16H 61/462* | (2010.01) |
| *F16H 61/475* | (2010.01) |
| *F16H 59/44* | (2006.01) |
| *F16H 59/08* | (2006.01) |
| *B60K 23/00* | (2006.01) |
| *B60K 20/00* | (2006.01) |
| *F16H 61/04* | (2006.01) |

(52) U.S. Cl.
CPC ............ *E02F 9/2253* (2013.01); *B60K 20/00* (2013.01); *B60K 23/00* (2013.01); *F16H 59/0204* (2013.01); *F16H 59/08* (2013.01); *F16H 59/44* (2013.01); *F16H 61/437* (2013.01); *F16H 61/462* (2013.01); *F16H 61/47* (2013.01); *F16H 61/475* (2013.01); *B60Y 2200/20* (2013.01); *B60Y 2200/41* (2013.01); *F16H 61/0437* (2013.01); *F16H 2300/18* (2013.01)

(58) Field of Classification Search
CPC .... E02F 9/2253; F16H 59/0204; F16H 59/44; F16H 61/437; F16H 61/462; F16H 61/47; F16H 2300/18; B60Y 2200/20; B60Y 2200/41

See application file for complete search history.

(56) References Cited

U.S. PATENT DOCUMENTS

| | | | |
|---|---|---|---|
| 2,137,959 A | 11/1938 | Turek | |
| 3,858,675 A | * 1/1975 | Geis | B60W 30/18 180/307 |
| 3,898,812 A | * 8/1975 | Walton | B60T 11/103 60/431 |
| 3,898,891 A | 8/1975 | Colloton | |
| 3,902,567 A | 9/1975 | Pekar, Jr. | |
| 4,111,003 A | 9/1978 | Bolinger et al. | |
| 4,495,770 A | 1/1985 | Sagaser et al. | |
| 5,295,414 A | 3/1994 | Nakamura et al. | |

(Continued)

OTHER PUBLICATIONS

European Search Report issued in counterpart application No. 18192190.9 dated Feb. 1, 2019. (7 pages).

(Continued)

*Primary Examiner* — Zakaria Elahmadi

(57) ABSTRACT

A hydrostatic transmission pedal stroke limiter includes a stop connected through a linkage to a range shift lever for limiting the travel of the hydrostatic transmission actuator arm when the range shift lever is in the low gear range, and reducing sound significantly when operating in the low gear range.

11 Claims, 4 Drawing Sheets

(56) References Cited

U.S. PATENT DOCUMENTS

| | | | |
|---|---|---|---|
| 5,345,839 A | 9/1994 | Nett et al. | |
| 5,553,453 A | 9/1996 | Coutant et al. | |
| 6,581,710 B2 | 6/2003 | Sprinkle et al. | |
| 7,287,620 B2 | 10/2007 | Thomas et al. | |
| 8,812,264 B2 * | 8/2014 | Runkle | G01F 1/80 |
| | | | 324/142 |
| 9,091,262 B2 * | 7/2015 | Runkle | F04B 49/002 |
| 9,174,613 B2 * | 11/2015 | Masumoto | B60T 7/06 |
| 9,242,553 B2 * | 1/2016 | Tani | B60K 15/063 |
| D779,563 S * | 2/2017 | Foster | D15/17 |
| 9,944,292 B2 * | 4/2018 | Tsuji | B60K 17/34 |
| 2004/0079077 A1 * | 4/2004 | Yano | B60K 17/105 |
| | | | 60/487 |
| 2007/0068152 A1 * | 3/2007 | Nishi | F16H 61/423 |
| | | | 60/490 |
| 2009/0260912 A1 * | 10/2009 | Isogai | B60K 17/10 |
| | | | 180/336 |
| 2014/0011638 A1 * | 1/2014 | Iwaki | B60W 10/10 |
| | | | 477/115 |
| 2014/0223898 A1 * | 8/2014 | Iida | A01D 34/69 |
| | | | 60/491 |
| 2016/0040691 A1 | 2/2016 | Matsuura et al. | |
| 2016/0053888 A1 | 2/2016 | Tsuji et al. | |

OTHER PUBLICATIONS

European Search Report issued in counterpart application No. 18202769.8 dated Mar. 21, 2019. (8 pages).

* cited by examiner

HYDROSTATIC TRANSMISSION PEDAL STROKE LIMITER

FIELD OF THE INVENTION

This invention relates to compact utility tractors with hydrostatic transmissions, and specifically to a hydrostatic transmission pedal stroke limiter.

BACKGROUND OF THE INVENTION

Compact utility tractors may have a two-range or three-range hydrostatic transmission with foot controls that allow the operator to select directions of travel and speed. The hydrostatic transmission may include a range shift lever connected to range gears for shifting between high, medium and low gear ranges. The hydrostatic transmission may provide variable ground speeds in each of the range gears using a single foot pedal or pair of foot pedals. There is a need to reduce the sound generated by compact utility tractors with hydrostatic transmissions to comply with sound level regulations at low speeds. Efforts to meet sound level regulations have included mounting hydrostatic transmissions with vibration deadening devices and resilient mounting members, and enclosing hydrostatic transmissions inside sound proofing covers or casings. However, sound reducing materials and enclosures are not always effective, and may be bulky and require more space than is available on many compact utility tractors.

SUMMARY OF THE INVENTION

A hydrostatic transmission pedal stroke limiter includes a linkage between a range shift lever and a stop that limits travel of a hydrostatic transmission actuator arm if the range shift lever is in a low gear range position. The linkage includes a cross shaft extending at least partially across a tractor frame. The hydrostatic transmission pedal stroke limiter reduces sound significantly while operating in the low gear range.

DESCRIPTION OF THE PREFERRED EMBODIMENT

Figure 1:
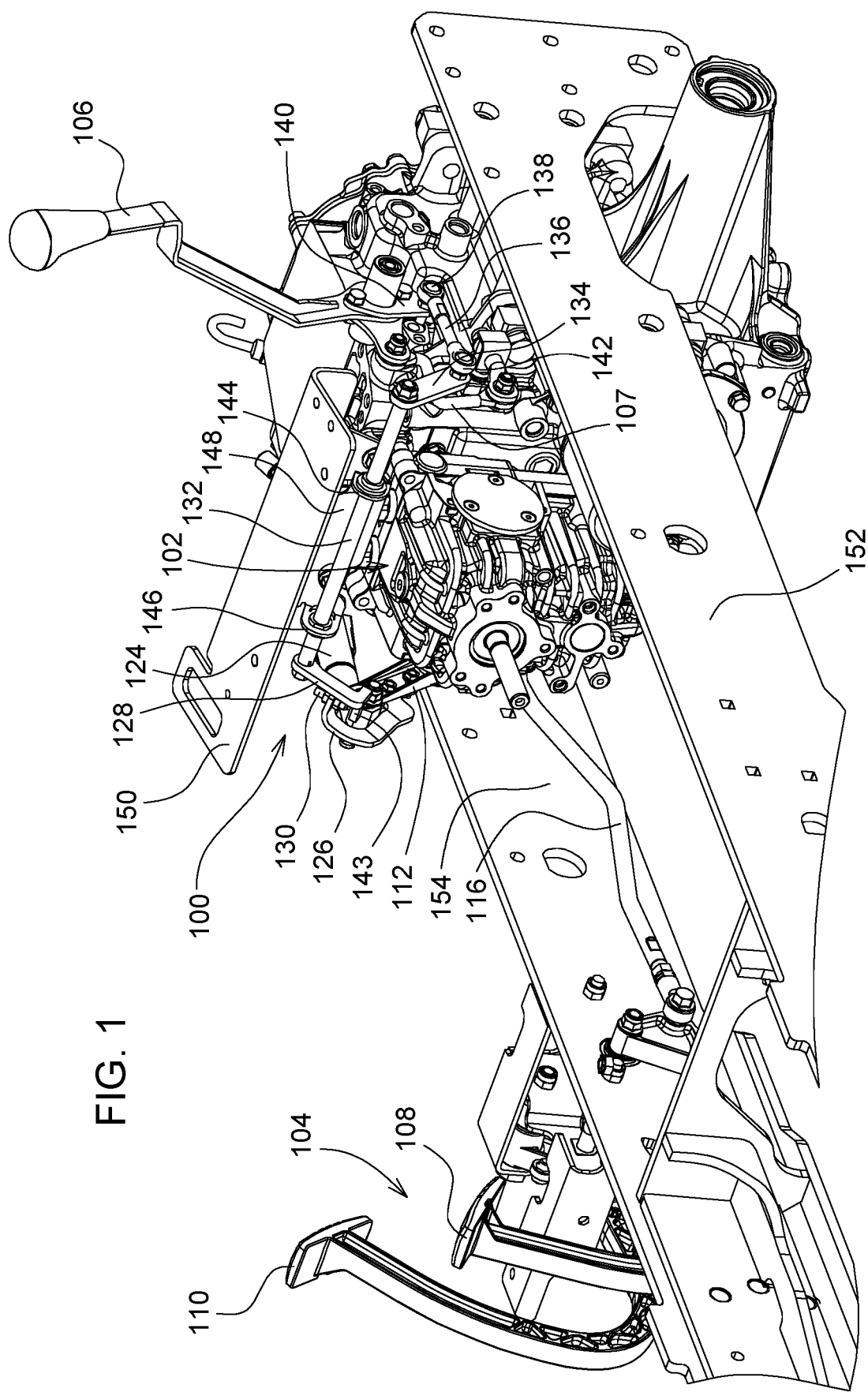
FIG. 1 is a side perspective view of a hydrostatic transmission pedal stroke limiter on a compact utility tractor according to a first embodiment of the invention.

In the embodiment shown in FIGS. 1-4, hydrostatic transmission pedal stroke limiter 100 may be on a compact utility tractor having a two-range or three-range hydrostatic transmission 102 with foot controls 104 that allow the operator to select forward and reverse directions of travel and speed. The hydrostatic transmission may include range shift lever 106 connected by arm 107 to range gears for shifting between high, medium and low gear ranges. The hydrostatic transmission may provide variable ground speeds in each of the range gears using a single foot pedal or pair of foot pedals 108, 110. For example, the low range gear may provide a range of ground speeds from 0 to about 10 km/hour.

In one embodiment, hydrostatic transmission pedal stroke limiter 100 may include hydrostatic transmission actuator arm 112 connected to trunnion shaft 114 of hydrostatic transmission 102. Pedals 104 may be used to pivot the actuator arm and turn the trunnion shaft to desired forward or reverse speed settings of the hydrostatic transmission. Pedals 104 may be connected with rod 116 to a lower end of the actuator arm. Slot 118 may be provided adjacent a lower end of the actuator arm to define the range of movement of the actuator arm. Bolt or pin 120 may extend through the slot and may be attached to the hydrostatic transmission. Eccentric adjuster 122 may be attached to an upper end of the actuator arm, and damper 124 may be connected between the eccentric adjuster and the engine or frame of the tractor.

In one embodiment, hydrostatic transmission pedal stroke limiter 100 may include catch 126 attached to an upper end of hydrostatic transmission actuator arm 112. When range shift lever 106 is shifted to a low range gear, catch 126 may contact stop 128 to limit rotation of the actuator arm beyond a specified maximum speed. Adjustment device 130 such as a set screw may be attached to catch 126 for adjusting the contact point of the stop and specified maximum speed.

Figure 2:
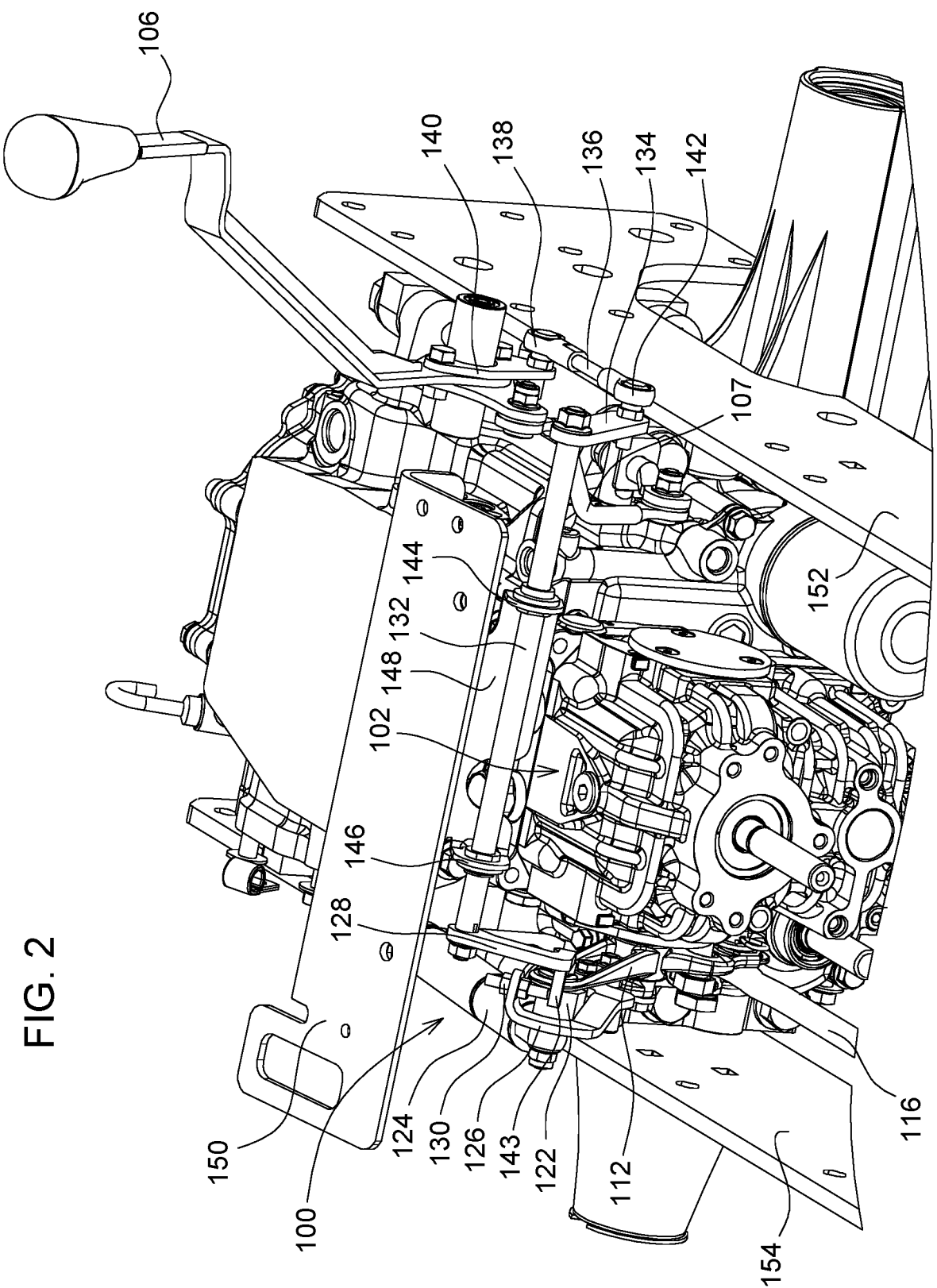
FIG. 2 is a top perspective view of a hydrostatic transmission pedal stroke limiter on a compact utility tractor according to a first embodiment of the invention.
Figure 3:
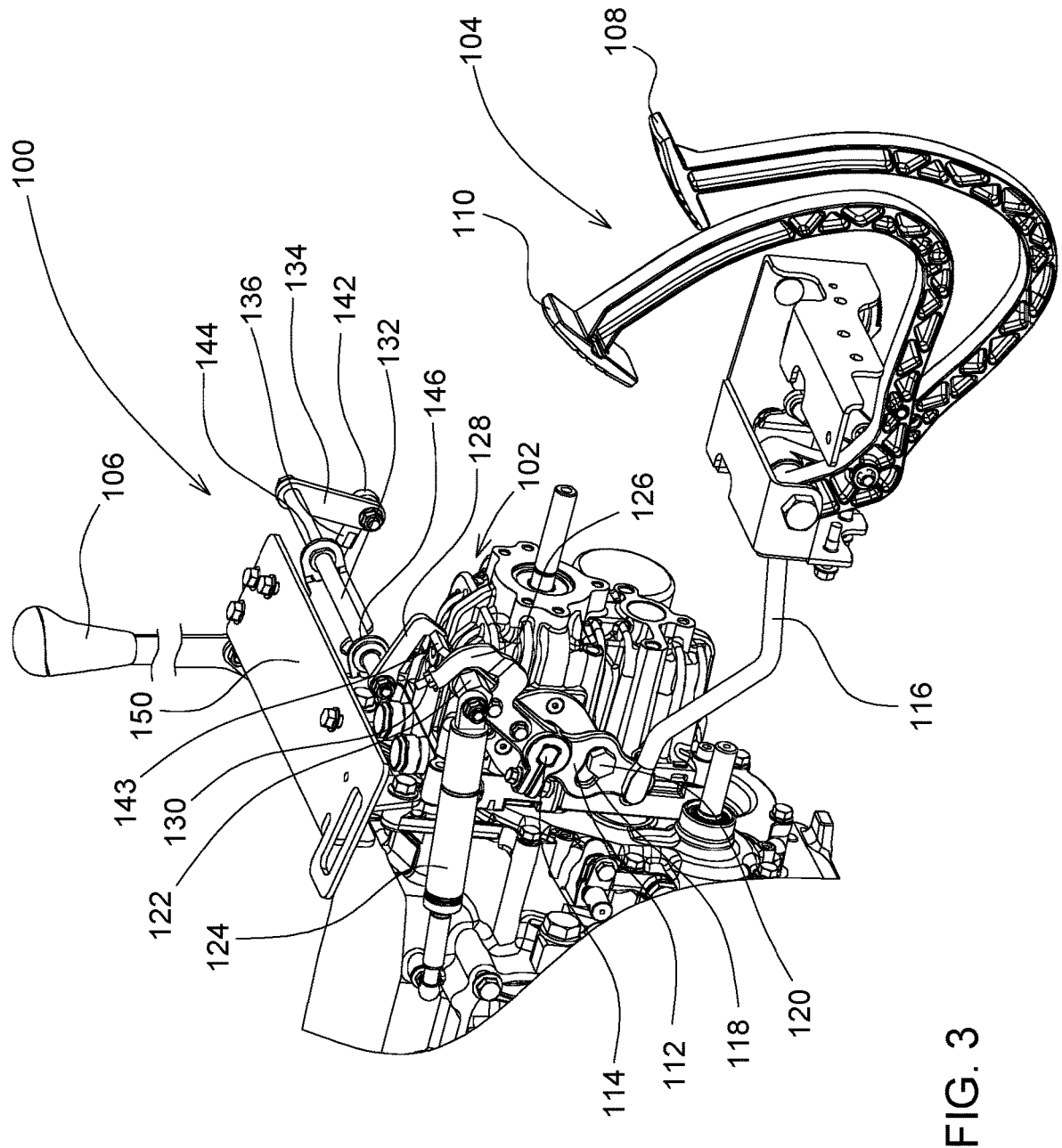
FIG. 3 is a side perspective view of a hydrostatic transmission pedal stroke limiter with the range shift lever in a medium or high range position that does not limit the pedal stroke according to a first embodiment of the invention.
Figure 4:
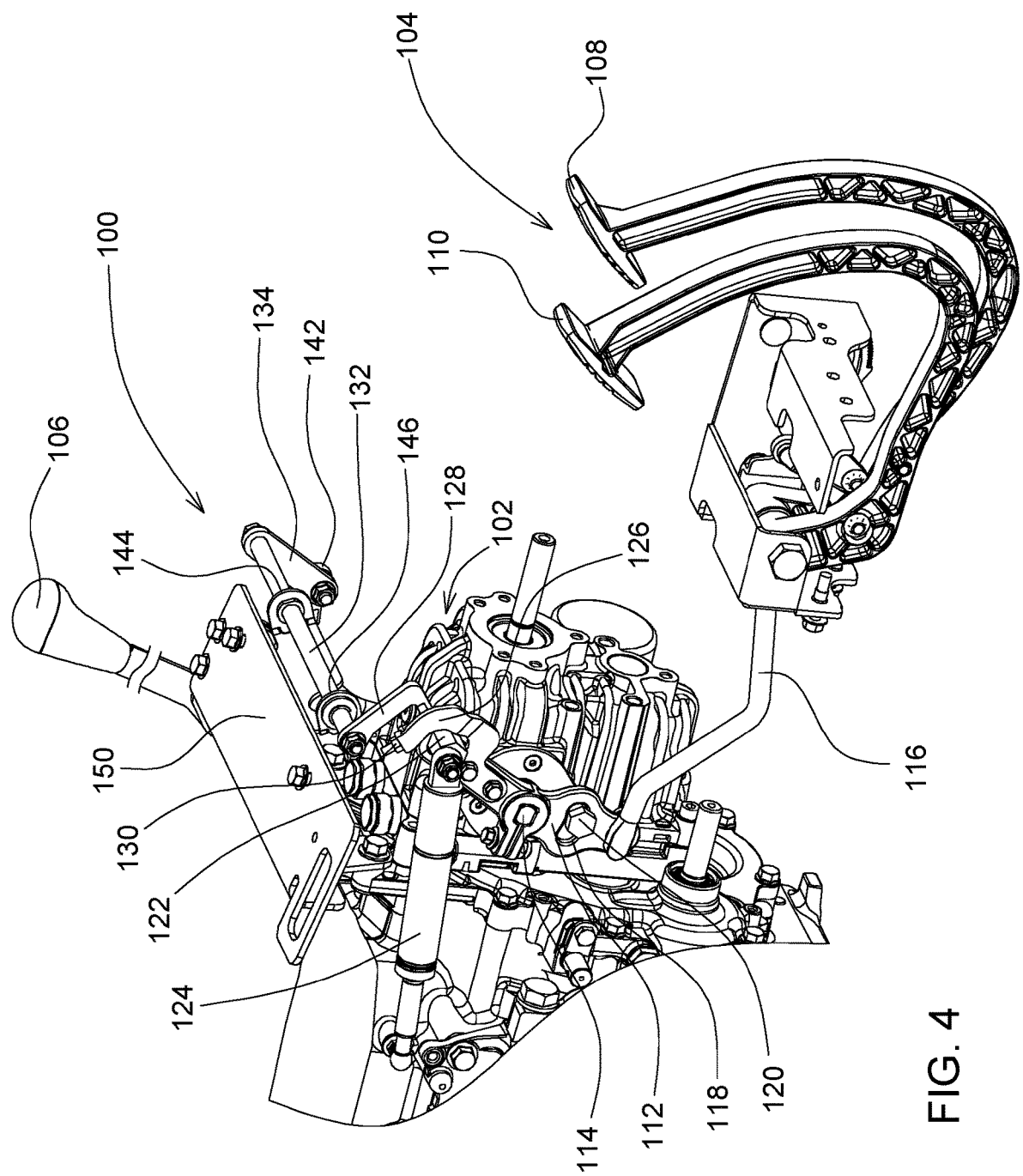
FIG. 4 is a side perspective view of a hydrostatic transmission pedal stroke limiter with the range shift lever in a low range position limiting the pedal stroke according to a first embodiment of the invention.

In one embodiment, hydrostatic transmission pedal stroke limiter 100 may include stop 128 connected to range shift lever 106 through a linkage including cross shaft 132, link arm 134 and rod 136. A first end of rod 136 may be attached with ball joint 138 to plate 140 on the range shift lever, and a second end of rod 136 may be attached with ball joint 142 to link arm 134. Link arm 134 may extend between rod 136 and cross shaft 132. Stop 128 may be generally L-shaped and may include finger 143 at one end thereof. When range shift lever 106 is in the low range, catch 126 may contact stop 128, as shown in FIGS. 2 and 4, limiting travel of actuator arm 112. When range shift lever 106 is in the medium or high range, catch 126 may not contact stop 128 and does not limit travel of actuator arm 112, because the stop is not in the path of catch 126, as shown in FIG. 3. Cross shaft 132 may extend laterally at least partially across the tractor between frame members 152, 154 and may be pivotably supported with bushings 144, 146 to bracket 148 attached to seat mount plate 150.

In one embodiment, hydrostatic transmission pedal stroke limiter 100 may reduce the sound level of a hydrostatic transmission and compact utility tractor when range shift lever 106 is in the low range, typically at traction speeds below about 10 km/hour. The hydrostatic transmission pedal stroke limiter may reduce the sound significantly by limiting the stroke of hydrostatic transmission 102 and the maximum speed in the low range.

Having described the preferred embodiment, it will become apparent that various modifications can be made without departing from the scope of the invention as defined in the accompanying claims.

The invention claimed is:
1. A hydrostatic transmission pedal stroke limiter, comprising:
 a range shift lever for shifting a plurality of range gears between a high gear range, a medium gear range and a low gear range;

a hydrostatic transmission for changing the ground speed within each of the gear ranges by actuating a forward pedal and a reverse pedal;

a linkage between the range shift lever and a stop, the linkage including a cross shaft extending at least partially across a tractor frame;

the range shift lever pivoting the stop to a position limiting travel of a hydrostatic transmission actuator arm while actuating the forward pedal or the reverse pedal if the range shift lever is shifted to the low gear range, and not limiting travel of the actuator arm while actuating the same forward pedal or reverse pedal when the range shift lever is shifted to the medium or high gear range position.

2. The hydrostatic transmission pedal stroke limiter of claim 1 wherein the stop includes a finger contacted by a catch attached to the hydrostatic transmission actuator arm when the range shift lever is shifted to the low gear range, and not contacted by the catch when the range shift lever is shifted to the medium or high gear range.

3. The hydrostatic transmission pedal stroke limiter of claim 1 wherein the cross shaft is supported by a bracket under a seat mount plate.

4. The hydrostatic transmission pedal stroke limiter of claim 2 further comprising an adjustment device attached to the catch for adjusting contact with the finger.

5. A hydrostatic transmission pedal stroke limiter, comprising:

a range shift lever for shifting a plurality of range gears including at least a low range gear and a high range gear;

a hydrostatic transmission actuated by at least one pedal connected to a trunnion of the hydrostatic transmission for varying the ground speed within each gear; and a stop limiting rotation of the trunnion at a maximum forward ground speed and a maximum reverse ground speed when the range shift lever is in the low range gear; and not limiting rotation of the trunnion when the range shift lever is in the high range gear.

6. The hydrostatic transmission pedal stroke limiter of claim 5 wherein the stop is connected to a linkage extending laterally at least partially across a tractor frame.

7. The hydrostatic transmission pedal stroke limiter of claim 6 wherein the linkage includes a horizontal cross shaft.

8. The hydrostatic transmission pedal stroke limiter of claim 6 wherein the linkage is attached to a seat plate.

9. The hydrostatic transmission pedal stroke limiter of claim 5 wherein the stop contacts a catch attached to a hydrostatic transmission actuator arm.

10. A hydrostatic transmission pedal stroke limiter, comprising:

a hydrostatic transmission with an actuator arm connected to a forward foot pedal and a reverse foot pedal each of which pivots a trunnion arm on a hydrostatic transmission;

a range shift lever connected to a plurality of range gears and shiftable between at least a low gear range and a high gear range; and a stop connected through a linkage to the range shift lever and limiting the travel of the hydrostatic transmission actuator arm when a forward pedal or a reverse pedal is depressed only when the range shift lever is in the low gear range; and not limiting the travel of the hydrostatic transmission actuator arm when the same forward pedal or reverse pedal is depressed when the range shift lever is in the high gear range.

11. The hydrostatic transmission pedal stroke limiter of claim 10 wherein the linkage extends from the range shift lever horizontally across a tractor frame to the hydrostatic transmission actuator arm.

* * * * *